United States Patent
Stoppa et al.

(10) Patent No.: US 7,378,638 B2
(45) Date of Patent: May 27, 2008

(54) PHOTO-SENSITIVE ELEMENT USED IN ELECTRO-OPTICAL SENSORS TO DETECT AND CONVERT INCIDENT LIGHT INTO AN ELECTRICAL SIGNAL

(76) Inventors: David Stoppa, Via Pine, 11, Terlago (TN) (IT) 38070; Andrea Simoni, Via Giovanni XXIII, 41, Montagna (TN) (IT) 38070; Monica Vatteroni, Via Bolghera, 48, Trento (IT) 38100

( * ) Notice: Subject to any disclaimer, the term of this patent is extended or adjusted under 35 U.S.C. 154(b) by 51 days.

(21) Appl. No.: 11/272,802

(22) Filed: Nov. 15, 2005

(65) Prior Publication Data
US 2007/0012868 A1 Jan. 18, 2007

(30) Foreign Application Priority Data
Jul. 18, 2005 (IT) .......................... UD2005A0119

(51) Int. Cl.
*H01J 40/14* (2006.01)
(52) U.S. Cl. .................. 250/214 R; 250/214.1
(58) Field of Classification Search ........... 250/214 R, 250/214.1, 214 LS, 208.1; 348/294–297, 348/302–308
See application file for complete search history.

(56) References Cited

U.S. PATENT DOCUMENTS

| 3,798,662 | A | * | 3/1974 | Suzuki ...................... 396/254 |
| 5,608,204 | A |   | 3/1997 | Höfflinger et al. |
| 6,498,576 | B1 |  | 12/2002 | Tian et al. |
| 6,940,589 | B1 | * | 9/2005 | Suyama et al. ............. 356/213 |

OTHER PUBLICATIONS

Institute for Microelectronics Stuttgart, Ulrich Seger et al., "Vision Assistance in Scences with Extreme Contrast", 1993, pp. 50-56.

* cited by examiner

*Primary Examiner*—Que T Le

(57) ABSTRACT

Photo-sensitive element for electro-optical sensors, including at least a photodiode able to generate a current that is function of the incident light, a conversion circuit able to convert the current generated into a voltage signal, a comparator able to commute if the voltage signal reaches or exceeds a determinate threshold signal, and at least a measuring and memorization element able to measure and memorize the temporal instant of commutation of the comparator and able to be driven by a reference signal in order to render available to an output line a signal estimating the incident light. The reference signal is of the type that can be programmed from outside.

26 Claims, 3 Drawing Sheets

PHOTO-SENSITIVE ELEMENT USED IN ELECTRO-OPTICAL SENSORS TO DETECT AND CONVERT INCIDENT LIGHT INTO AN ELECTRICAL SIGNAL

This application claims the priority of Italian Patent Application No. UD2005A000119 filed on 18 Jul. 2005.

FIELD OF THE INVENTION

The present invention concerns a photo-sensitive element used in electro-optical sensors, suitable to detect an incident light and to convert it into a correlated electric signal.

The photo-sensitive element, according to the present invention, is used to achieve electro-optical sensors of the linear or two-dimensional matrix type that can be used in different devices for artificial vision, such as for example digital video cameras, intelligent optical sensors or other.

The photo-sensitive element according to the invention guarantees a very satisfactory image-quality both in conditions of poor light and in the presence of uncontrolled light, hence characterized by a variable intensity in a wide range, for example to achieve electro-optical sensors used in the field of automobiles, security control, road controls and traffic controls.

BACKGROUND OF THE INVENTION

Electro-optical sensors are known, consisting of a plurality of photo-sensitive element or pixels, able to detect light signals and to transmit them, in the form of electric signal, to a calculator which processes them and obtains images from them. The images are then transmitted to display devices able to allow a user to see the images or information deriving therefrom.

The optical sensors were previously made using CCD technology (Charged-Coupled Device), which guarantees a very satisfactory image quality in the presence of well-controlled lighting, but which does not allow to operate in an optimum manner when there is a highly differentiated light inside the same scene, that is, with an input signal having high dynamics, more than 120 dB.

Furthermore, CCDs are not very versatile from various viewpoints: they cannot easily be integrated with complex driving circuits in a single silicon support, the so-called microchip, and it is not possible to arbitrarily select a sub-window inside the matrix sensor.

To overcome some of these disadvantages of CCDs, optical sensors have been developed based on the CMOS type silicon technology (Complementary Metal Oxide Semiconductor), able to offer a good result even in conditions of very diversified lighting inside the same scene (see, for example, Seger, Graf, Landgraf—"Vision assistance in Scene with extreme Contrast"—IEEE Micro, vol. 13 page 50, February 1993).

This result can be obtained through a compression on logarithmic scale of the signal inside the photo-sensitive element. However, this conversion, obtained for example by connecting to the photo-sensitive element junction a MOS type transistor in diode configuration, as described in U.S. Pat. No. 5,608,204, suffers from the fundamental disadvantage of providing a low image definition in the event of low lighting.

High-resolution images are obtained by means of a linear reading of the photo-sensitive element; this technique, however, has the disadvantage that it does not give the possibility of obtaining good quality images in conditions of very diversified lighting inside the same scene.

To overcome this limitation, techniques are known which allow to extend the interval of visible light inside the same scene.

These techniques are very different from each other and allow to obtain information on a linear scale in conditions of low lighting, which guarantees high definition, and linear or compressed information on different scales, according to the technique used, in conditions of average-to-high luminosity.

It is also possible to distinguish between techniques that use information contained inside a single image or those which combine information arriving from several images obtained with different exposure times, in this case called multi-integration.

Among the various alternatives that exploit information contained inside the same scene, the technique is known which uses a linear output for low lighting and obtains information at the instant when there is saturation of the linear signal in order to map the average-to-high luminosity. In order to do this, a comparator is used which commutes at the instant when the linear signal reaches a threshold identified by the comparator as the saturation level. As consequence of this commutation, two reference signals are stored inside two analog memories (C1, C2). The reference signals are generated outside, in fixed and pre-determined views. From the combination of the two stored signals it is possible to obtain information for luminosity which would not be mappable by exploiting the linear signal. It should be noted that the information found from the memories C1 and C2 can be combined, but this information is totally separated from what is obtained through the linear output which, at the moment the comparator starts up, becomes insignificant.

The implementation of this known technique, using two fixed reference slopes employed in a combined manner, has the disadvantage, however, that it is necessary to realize a bulky photo-sensitive element and is therefore difficult to exploit for industrial devices, which require a high level of integration in order to achieve high-performance pixels integrated into a single silicon chip.

One purpose of the invention is to achieve a photo-sensitive element for electro-optical sensors which can be integrated into a silicon support element, or substrate, of limited size, achieving a microchip, and which is suitable to provide good-quality images at a high repetition frequency both in the case of low lighting and also in the case of an input signal characterized by high dynamics.

The Applicant has devised, tested and embodied the present invention to overcome the shortcomings of the state of the art and to obtain these and other purposes and advantages.

SUMMARY OF THE INVENTION

The present invention is set forth and characterized in the main claim, while the dependent claims describe other characteristics of the invention or variants to the main inventive idea.

In accordance with the above purposes, a photo-sensitive element according to the present invention comprises:

a photo-sensitive reception means, such as for example a diode, or photodiode, inversely polarized, a circuit consisting of at least a switch made using silicon technology used to restore the reset voltage of the reception means, a comparator that allows to discriminate between a linearly mappable region, in the traditional manner, and the region which exceeds this linear zone, and two reading channels, each with at least an element of active amplification.

The photo-sensitive element according to the present invention can be used to obtain an output signal deriving, in conditions of low lighting, from the linear reading of the output of the signal arriving from the reception means, and in conditions of high lighting, from information connected to the instant when the reception means reaches saturation.

According to a characteristic of the present invention, to obtain this information an external reference signal is exploited which has a variable and programmable configuration.

The use of a programmable reference signal allows to detail, in a diversified manner and according to the needs connected to the type of processing which is to be performed with the image, the signal relating to average-to-high lighting.

According to a variant of the invention, it is provided to add at least a MOS-type transistor in diode configuration having a terminal connected with the photo-sensitive node. In this case, the conventional linear output will always be significant, returning a signal which in the event of average-to-high luminosity will be the result of a logarithmic compression.

The presence of the external programmable reference signal is fundamental for the functioning of the photo-sensitive element, because it allows to obtain information connected to the signals that exceed the linear dynamic obtained in the traditional manner. The programmable nature of the reference signal thus guarantees the possibility of obtaining different compressions for the various lighting zones, according to the needs connected to the type of application.

Advantageously the reference signal is of the type with a voltage slope. Different voltage slopes can also be used, instead of a single one, in order to improve the signal-noise ratio and to further extend the dynamics. The information in this case is sampled on one or more memorization elements.

More preferably, the voltage slope is of the pice-wise linear type, i.e. a programmable slope which uses a linear reference in segments on several consecutive temporal intervals.

If it is necessary to detail in equivalent manner the whole temporal interval available, a monotone linear slope is advantageously used, which allows to obtain a compression proportional to the inverse of the acquisition time over the whole integration interval.

If it is necessary to detail in a more precise manner a zone with higher luminosity, it is possible to use a linear slope in segments, having a first very steep segment which uses a significant part of the range of signals available, and much less steep in the remaining temporal range, so as to cover the whole remaining temporal range with the remaining voltage dynamics.

These are only two extreme examples of functioning, from which it is possible to deduce all the intermediate combinations.

In all cases, the input signal generated by the reception means advantageously has a sufficiently high value to allow an efficient processing and good immunity with respect to electric noises generated by the other components present on the support, advantageously a microchip, where the photo-sensitive element is installed.

According to an evolution of the invention, it is provided to introduce a reaction circuit which allows to pilot a switch in order to restore the reset voltage on the photo-sensitive node by means of the output of the comparison element in a totally asynchronous manner with respect to the external signals and, at the same time, to memorize in the analog memory information relating to the first zeroing that takes place after the beginning of integration.

By means of a suitable programming of the external reference it is thus possible to obtain both compressed information, exploiting only the information on the memorization element, in an identical manner to what happened in the previous implementation, and also a linear information on extended dynamics, by exploiting the combination of traditional, linear information, with that contained in the analog memory, connected to the first zeroing. Everything depends on the type of program effected by the external reference signal; in fact, it is possible to map the information in a completely linear manner using a suitable linear signal in segments.

In this case, the memorization element will contain information relating to the time that has passed from the beginning of the integration until the first time when the saturation level is reached; by means of this datum it will be possible to find the number of times that the reception means is saturated during the integration time. Combining this information with that of the standard output which, thanks to the asynchronous reset mechanism, will still be significant, it will be possible to find a linear information also for a signal dynamic that otherwise would not be able to be coded inside the same image using an integrated photo-sensitive element with a traditional structure.

An alternative is to surrender linearity over the whole time range, and be satisfied with a compression of the signal for higher levels of luminosity, with the advantage that it is possible to map a greater light range.

In this case, the external reference will be a monotone slope in a first interval that will map the greater light intensities, and linear in segments in the interval corresponding to the average light intensities. For the higher light intensities only the information contained in the analog memory will be significant, whereas the traditional linear one will be lost; for average light intensities the information will be obtained from the combination of the two bits of information, which in this case are both significant, and finally, for low light intensities only the tradition linear output will be significant.

These are only two examples for programming the slope which can be used as a reference for processing other types of programming.

By combining this system with a suitable system to analyze the image obtained, it is also possible to achieve an adaptive system wherein the response curve of the sensor is optimized according to the distribution of intensity on the scene in question.

The circuit configuration described has the following advantages:

it has the capacity to detect the luminous radiation in a wide range of intensity, more than 120 dB, inside a single image;

it provides good quality images even in conditions of low luminosity at input and hence low photo-generated current;

it allows to explore zones with different luminosity with programmable precision;

the photo-sensitive element can be implemented in a structure with a bulk such as to allow it to be used in industrial applications.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
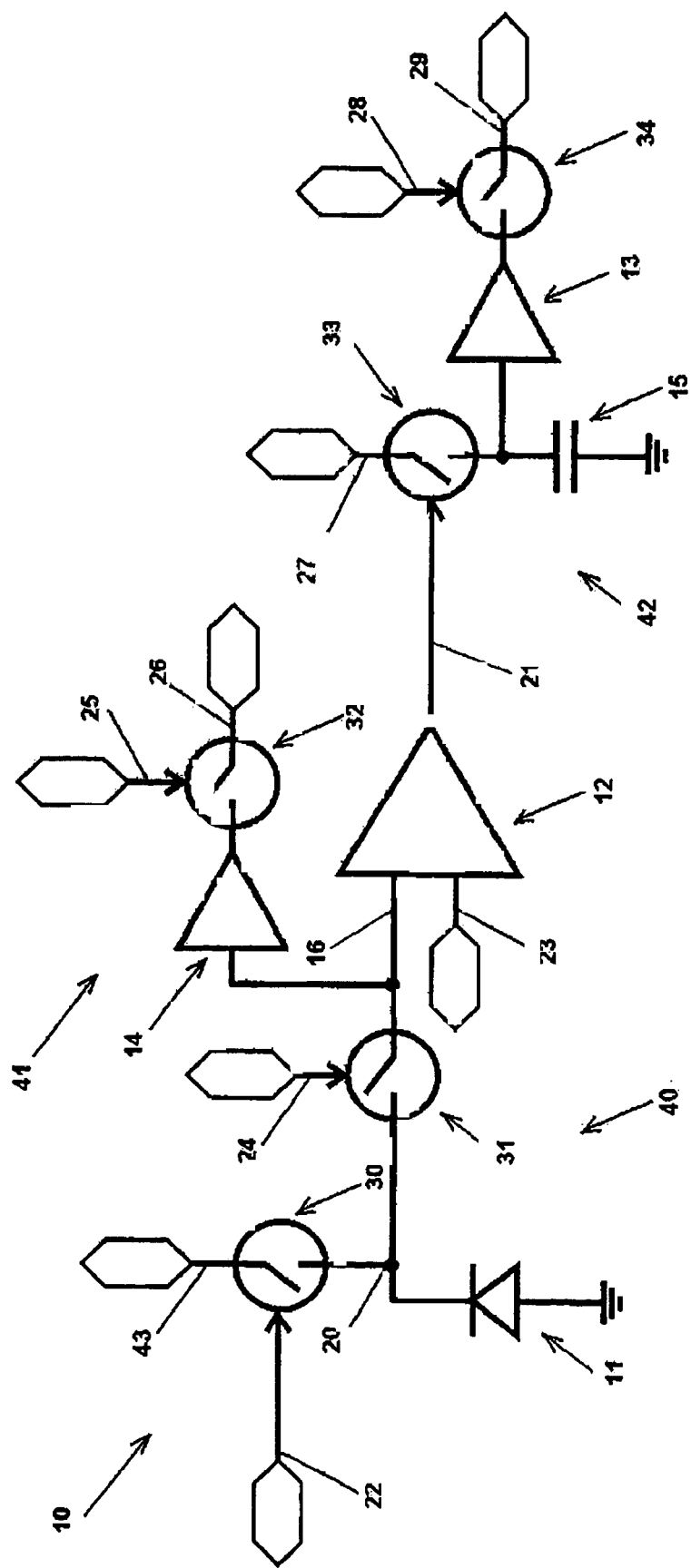
FIG. 1 is an electric wiring diagram of a photo-sensitive element according to the present invention.

With reference to FIG. 1, a photo-sensitive element 10, or pixel, according to the present invention comprises:

an element to detect and convert 40 the light signal, which comprises a photodiode 11, inversely polarized, a reset switch 30 made using semiconductor technology and driven by means of an external reset signal 22 which allows to connect an external signal 43 to a photo-sensitive node 20, and a first de-coupling switch 31 made using semiconductor technology and driven by means of a shutter control signal 24;

a comparison element 12 to which two signals arrive, a threshold signal 23 and a signal 16 arriving from the photodiode 11 by means of the first de-coupling switch 31;

two reading channels, respectively first 41 and second 42, of which the first 41 consists of an active amplification element 14 and a selection switch 32 made using semiconductor technology, driven by a first external selection signal 25 which leads the output signal onto a reading line 26.

The second reading channel 42, on the contrary, comprises a memorization element, or counter, which in a preferential embodiment comprises a memorization switch 33 made using semiconductor technology driven by the output 21 of the comparison element 12 and at the ends of which has an external reference signal 27 and a memory 15 which in the case shown here is a capacitance.

The second reading channel 42 also comprises a second active amplification element 13 and a second de-coupling switch 34 made using semiconductor technology, driven by a second external selection signal 28 which leads the output signal onto a second reading line 29.

The photo-sensitive element 10 can advantageously be used to constitute the single cell of a matrix sensor with multiple cells made entirely using semiconductor technology and therefore able to be integrated into a chip.

The detection and conversion element 40 is of the type able to detect the light of a wavelength belonging to the visible spectrum and beyond, and with an intensity varying in an range of at least 6 decades, between $10^{-3}$ and $10^3$ W/m².

The photodiode 11 is made from an N-type insulated junction, medium doped, which can be made by means of Nwell, or strongly doped, made by means of a diffusion N+ and the substrate P. The interface region between the two parts of the photodiode 11 is emptied of free charges and characterized by the presence of an internal electric field which can be increased by polarizing inversely the photodiode 11, even from outside.

To this purpose, a mass contact has been placed in the structure, in the substrate, and the N-type diffusion remains insulated or is connected to a positive voltage according to the state of the reset switch 30 driven externally by means of the external reset signal 22.

The substrate P, which represents a common point for the N-channel transistor, weakly doped, is polarized to ground.

The switches 30-34 inside the circuit described above are made using semiconductor technology in structures that can be with a single transistor P or N, or more complex; such structures are known in the art and reference can be made to literature in order to find the possible alternatives.

The reset switch 30 allows to vary the state of the photodiode 11 from reset to integration and vice versa.

The first de-coupling switch 31 is driven externally by means of the shutter control signal 24 and, according to its state, the photo-sensitive node 20 is kept insulated or connected to the coding and reading circuit that lies downstream.

The selection switch 32 and the second de-coupling switch 34 are used for the connection with the circuit outside the photo-sensitive element 10.

The comparison element 12 is used as a discriminator between the possible functioning zones of the photo-sensitive element 10, in fact it changes state at the instant the traditional linear output reaches a signal level identified by the comparator 12 as the saturation level. In order to do this, the comparison element 12 compares the output signal 16 from the detection and conversion element 40 with the threshold signal 23.

The comparison element 12 is made using semiconductor technology and is implemented with any circuit architecture whatsoever, both double and single input, both open ring and retro-activated, including automatic zero setting techniques to reduce the offset of the input voltage, as is known in the state of the art.

The memorization circuit, consisting of the memory 15 and the memorization switch 33 driven by the output of the comparison element 12, represents an analog temporal counter: the temporal information is coded by exploiting the external reference signal 27, which is a voltage signal, which varies over time and is distributed to the whole matrix of photo-sensitive elements 10.

When the comparator 12 commutes, the memorization switch 33 is opened, in this way the voltage value assumed by the reference slope at that instant remains on the memory 15, or analog memory. More efficient sample and hold systems can be used instead of the simple structure of the memorization switch 33 and memory 15.

A fundamental element of the structure is the external reference signal 27 which represents a reference that can be programmed by the user, in a suitable manner and according to the application.

In a preferential application the external reference signal 27 is a linear signal in segments.

Moreover, by combining this system with a programmable reference signal with a suitable system to analyze the image thus obtained, it is possible to achieve an adaptive system in which the response curve of the photodiode 11 is optimized according to the distribution of intensity on the scene in question.

In one evolution of the invention, different voltage slopes can be used, instead of a single one, in order to improve the signal-noise ratio and further extend the dynamics detectable by the photo-sensitive element 10. The information in this case is memorized on an equal number of elements, analogous to those present in the second reading channel 42 inside each photo-sensitive element 10 of the matrix.

Instead of the analog memory, in every photo-sensitive element 10 an N-bit digital counter can be implemented, which measures the passing of time with multiples of the period of the synchrony signal which is supplied at input and which stops as soon as the output 21 of the comparison element 12 changes state.

Figure 2:
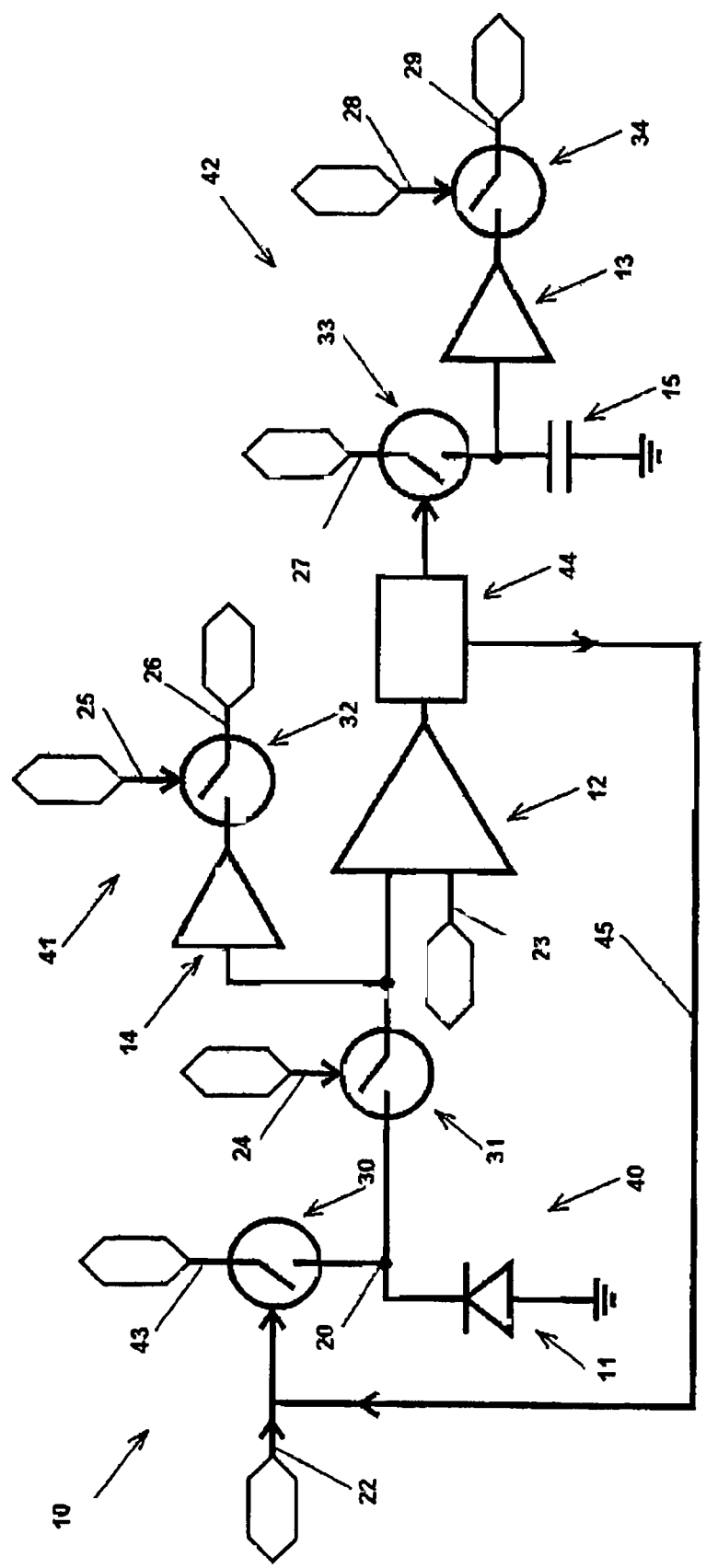
FIG. 2 shows a variant of FIG. 1.

FIG. 2 shows a variant of the invention, where the structure is analogous with that shown in FIG. 1, but with the addition of a control element 44 and a feedback line 45.

The control element 44 is suitable to measure and memorize the temporal instant when the first commutation of the comparison element 12 occurs, and to control the feedback line 45 which goes to drive the reset switch 30 in asynchronous manner.

The control element 44 makes the memorization switch 33 commute at the instant when the photodiode 11 reaches the saturation level for the first time, which corresponds to the first commutation of the comparison element 12, and simultaneously goes to vary the state of the reset switch 30, again taking the photodiode 11 to a reset state from which a new integration can start. This can take place automatically because the state of the comparison element 12 again varies after the variation in state of the reset switch 30; subsequently, always by means of reaction, the detection and conversion element 40 is also again taken to a state of integration by means of a new variation in the reset switch 30.

In any case, the element for measuring and memorizing the temporal instant when the comparison element 12 commutes must act so that a value is fixed on the memory 15 which will leave a trace of the instant when the first commutation takes place, making this part of the circuit insensitive to what happens after that instant.

In another form of embodiment, the circuit part comprising the control element 44, the memory 15 and the memorization switch 33 can be made with a digital counter driven by a digital synchrony signal, or clock, which hold its state as soon as the output of the comparison element 12 changes state and can be implemented by means of one or more switches which sample, by means of one or more capacitance, the value of one or more voltage slopes having a temporal development that can be programmed by the user.

According to a third form of embodiment, the circuit part comprising the control element 44, the memory 15 and the memorization switch 33 can be made with a digital counter driven directly by the output of the comparator 12, so as to count the number of times the comparator 12 changes state during acquisition.

The conversion of incident light signal to voltage occurs by means of a combination of the two signals present on the reading lines 26, 29. To be more exact, the signal present on the first reading line 26 is a function of the integer in time of the photo-generated current, while the signal present on the second reading line 29 is a function of the time that has passed from the start of measuring to the instant when the comparison element 12 commutes for the first time.

Figure 3:
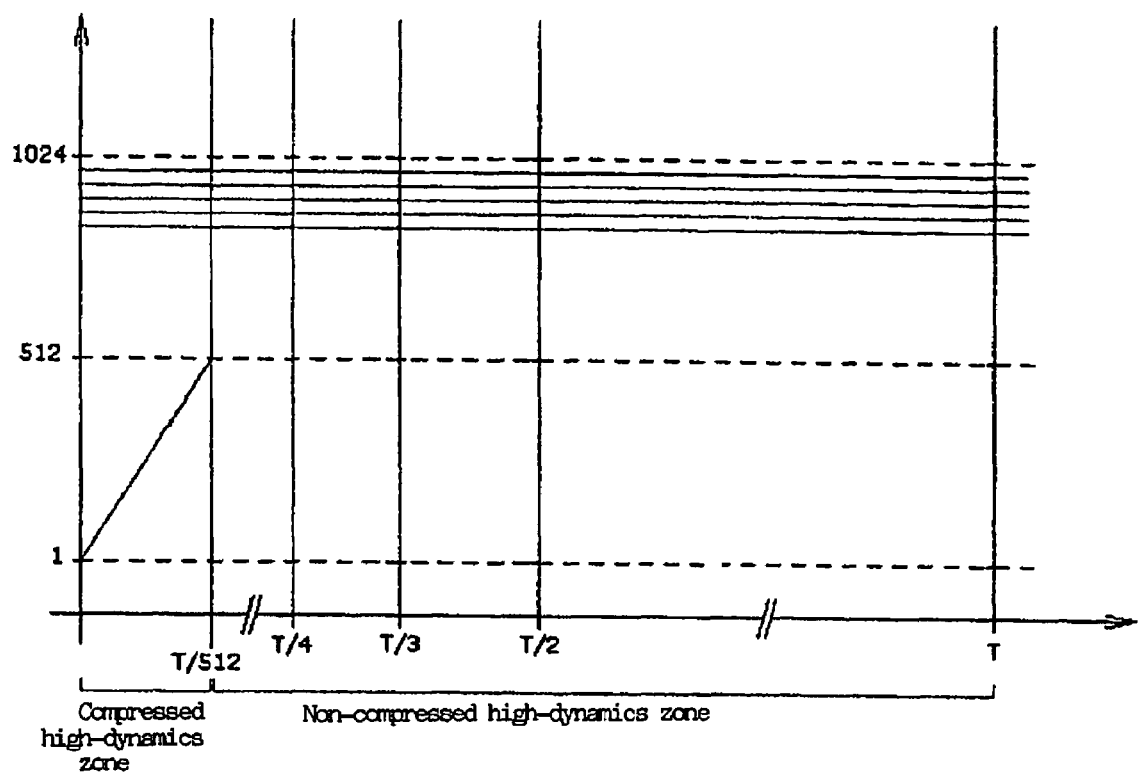
FIG. 3 shows the graph of the development of a programmable external reference signal.

The external reference signal 27, as in the first embodiment, is the externally programmable signal and, according to the form of this signal 27, we will obtain a different output on the second reading line 29. As described before, in a preferential case, the external reference signal 27 can be linear in segments, a monotone slope or a combination of the two, the last example being shown in FIG. 3. In the embodiment where said signal 27 is a monotone slope, the functioning is the same as that of the structure described in FIG. 1.

It is clear that modifications and/or additions of parts may be made to the photo-sensitive element 10 as described heretofore, without departing from the field and scope of the present invention.

It is also clear that, although the present invention has been described with reference to some specific examples, a person of skill in the art shall certainly be able to achieve many other equivalent forms of photo-sensitive elements for electro-optical sensors, having the characteristics as set forth in the claims and hence all coming within the field of protection defined thereby.

The invention claimed is:

1. Photo-sensitive element for electro-optical sensors, comprising:
   at least a photo-sensitive reception means able to generate a current that is a function of light coming from an external light source and incident on the reception means,
   a conversion circuit able to convert said current generated into a voltage signal,
   a comparison element able to change its state if said voltage signal reaches or exceeds a threshold signal defined by a user and identified as a saturation level of the photo-sensitive reception means, and
   at least a measuring and memorization element able to measure and memorize the temporal instant in which said comparison element changes its state, and able to be driven by a reference signal to render available to an output line a signal estimating the light incident on the reception means,
   wherein said reference signal is time variant and programmable by the user.

2. Photo-sensitive element as in claim 1, wherein said time variant reference signal is configured to define a threshold for the photo-generated signal, and
   if the threshold is exceeded, said comparison element changes its state, the instant of this change is mapped in a memory, and the value of this photo-generated voltage signal in said instant characterizes a level of compression of the signal available to said output line at least as a function of the shape of the reference signal itself and the reference signal can be optimized at least as a function of the light intensity detected by said photo-sensitive reception means.

3. Photo-sensitive element as in claim 1, wherein said reference signal is of the time dependent voltage ramp type.

4. Photo-sensitive element as in claim 3, wherein said voltage ramp is of a pice-wise linear type.

5. Photo-sensitive element as in claim 3, wherein said voltage ramp has a monotone linear slope to obtain a compression proportional to the time in saturation of the specific photo-sensor over the whole time interval for light integration.

6. Photo-sensitive element as in claim 3, wherein said voltage ramp has a decreasing pice-wise linear slope, with a first very steep development in a first time interval and a much less steep development in the residual time to cover the whole time interval for light integration.

7. Photo-sensitive element as in claim 2, wherein the time variant reference signals are more than one, to obtain a consequent improvement in the signal to noise ratio and a further extension of the light dynamics recoverable by the photo-sensitive element.

8. Photo-sensitive element as in claim 7, wherein the number of time variant reference signals determines the number of measuring and memorization elements and amplification and reading circuits to detect relative signals.

9. Photo-sensitive element as in claim 7, wherein the comparison element is made using semiconductor technology and implemented with any circuit architecture.

10. Photo-sensitive element as in claim 8, wherein said amplification and reading circuits comprise at least an active amplification element consisting of at least a transistor, suitable to carry out a first amplification of the signal, and a switch to connect said photo-sensitive reception means to respective lines to transmit the signal.

11. Photo-sensitive element as in claim 1, further comprising a de-coupling switch driven externally which, according to the state of the switch, causes the insulation or connection of the photo-sensitive reception means from/to coding and reading means located downstream.

12. Photo-sensitive element as in claim 1, wherein said measuring and memorization element comprises a counter able to maintain, or store, its state as soon as the output of said comparison element commutes or changes state.

13. Photo-sensitive element as in claim 12, wherein said counter comprises one or more switches able to sample by means of one or more analog memories the value of one or more reference signals, each having a temporal development that can be programmed by the user.

14. Photo-sensitive element as in claim 12, wherein said counter is made by implementing an N-bit digital counter that measures the passing of time with multiples of the period of the synchrony signal which is provided at input and which stops as soon as the output of said comparison element changes state.

15. Photo-sensitive element as in claim 12, wherein said counter is made by means of a sample and hold system.

16. Photo-sensitive element as in claim 1, wherein the photo-sensitive element is able to detect the light of a wavelength comprised in the visible spectrum and beyond, and of an intensity variable within a range of at least 6 decades between $10^{-3}$ and $10^3$ W/m$^2$.

17. Photo-sensitive element as in claim 16, wherein said intensity dynamic is detectable by means of said programmable reference signal and at least a measuring and memorizing element.

18. Photo-sensitive element as in claim 1, further comprising a control element able to drive at least said measuring and memorization element, and a feedback line controlled by said control element.

19. Photo-sensitive element as in claim 18, wherein said feedback line is driven by the control element at least according to the state in which said comparison element is, and allows to drive a reset switch in an asynchronous manner with respect to external signals.

20. Photo-sensitive element as in claim 1, wherein said measuring and memorization element comprises a digital counter directly commanded by the output of said comparator to count the number of times said comparator commutes or changes state during acquisition.

21. Photo-sensitive element as in claim 1, wherein said photo-sensitive reception means comprises an N-type photodiode, consisting of the junction between an N-type insulated diffusion and a P-type silicon substrate, able to define an interface region emptied of free charges and characterized by the presence of an internal electric field.

22. Photo-sensitive element as in claim 1, wherein said photo-sensitive reception means comprises a P-type photodiode, consisting of the junction between a P-type insulated diffusion and an N-type silicon substrate, able to define an interface region emptied of free charges and characterized by the presence of an internal electric field.

23. Photo-sensitive element as in claim 10, wherein said switches are made using silicon.

24. Photo-sensitive element as in claim 10, wherein the photo-sensitive element is able to be entirely integrated in a silicon substrate of limited size to embody a microchip.

25. Photo-sensitive element as in claim 1, configured to constitute one cell in a multiple-cell linear or matrix sensor.

26. Photo-sensitive element as in claim 7, wherein the comparison element is made using semiconductor technology and implemented with a circuit architecture selected from the group consisting of double and single input, open ring and circuit architecture providing retro-activated, automatic zero setting techniques to reduce the offset of the input voltage.

* * * * *

UNITED STATES PATENT AND TRADEMARK OFFICE
CERTIFICATE OF CORRECTION

PATENT NO. : 7,378,638 B2  
APPLICATION NO. : 11/272802  
DATED : May 27, 2008  
INVENTOR(S) : David Stoppa et al.

It is certified that error appears in the above-identified patent and that said Letters Patent is hereby corrected as shown below:

On the Title page, insert item --(73) Assignee: NEURICAM SPA, Trento, Italy--

Signed and Sealed this

Twenty-seventh Day of October, 2009

David J. Kappos  
*Director of the United States Patent and Trademark Office*